United States Patent
Hirao et al.

(10) Patent No.: US 7,095,536 B2
(45) Date of Patent: Aug. 22, 2006

(54) HOLOGRAPHIC RECORDING MEDIUM AND HOLOGRAPHIC RECORDING MEDIUM MANUFACTURING METHOD

(75) Inventors: Akiko Hirao, Chiba (JP); Kazuki Matsumoto, Kanagawa (JP); Katsutaro Ichihara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/346,315

(22) Filed: Feb. 3, 2006

(65) Prior Publication Data
US 2006/0126141 A1 Jun. 15, 2006

Related U.S. Application Data

(62) Division of application No. 10/876,028, filed on Jun. 25, 2004, now Pat. No. 7,031,037.

(30) Foreign Application Priority Data
Jun. 27, 2003 (JP) ............................ 2003-185274

(51) Int. Cl.
*G03H 1/02* (2006.01)
(52) U.S. Cl. .............................. 359/3; 359/7; 359/494; 369/112.03
(58) Field of Classification Search ................ 359/3, 359/4, 7, 494, 500; 369/112.03
See application file for complete search history.

(56) References Cited

U.S. PATENT DOCUMENTS

| 5,999,281 A | 12/1999 | Abott et al. |
|---|---|---|
| 6,512,085 B1 | 1/2003 | Minabe et al. |
| 6,562,274 B1 | 5/2003 | Asakura et al. |
| 6,586,515 B1 | 7/2003 | Koike |
| 6,946,188 B1 | 9/2005 | Hebrink et al. |
| 2004/0013076 A1* | 1/2004 | Funato et al. .......... 369/112.12 |
| 2004/0156106 A1* | 8/2004 | Allen et al. ................. 359/500 |
| 2005/0047705 A1* | 3/2005 | Domash et al. ............... 385/10 |

FOREIGN PATENT DOCUMENTS

JP 2002-123949 4/2002

\* cited by examiner

*Primary Examiner*—Fayez G. Assaf
(74) *Attorney, Agent, or Firm*—Finnegan, Henderson, Farabow, Garrett & Dunner, L.L.P.

(57) ABSTRACT

A holographic recording medium includes a transparent layer having a servo surface and a light incidence surface which face each other; a reflecting layer formed on the servo surface-side transparent layer; and a holographic recording layer formed on the light illuminating-side transparent layer. The transparent layer includes resin films laminated so that adjacent resin films differ in stretching direction by 90 degrees.

6 Claims, 11 Drawing Sheets

HOLOGRAPHIC RECORDING MEDIUM AND HOLOGRAPHIC RECORDING MEDIUM MANUFACTURING METHOD

CROSS-REFERENCE TO RELATED APPLICATIONS

This is a divisional application of application Ser. No. 10/876,028, filed Jun. 25, 2004, now U.S. Pat. No. 7,031,037 B2, which is incorporated herein by reference.

This application is based upon and claims the benefit of priority from the prior Japanese Patent Application No. 2003-185274 filed on Jun. 27, 2003 the entire contents of which are incorporated herein by reference.

BACKGROUND OF THE INVENTION

1) Field of the Invention

The present invention relates to a holographic recording medium and a method of manufacturing the holographic recording medium.

2) Description of the Related Art

Recently, collinear holographic recording systems in reflection geometry have been proposed to solve disadvantages in the angular multiplexing in the transmission geometry (See, for example, Japanese Patent Application Laid-open No. 2002-123949). An optical recording medium used for such systems includes a plastic substrate provided at least below a recording layer, and a reflecting layer on its rear surface. A recording beam and a reference beam are passed through a coaxial optical path and incident on the recording layer of the optical recording medium. An interference pattern is formed on this recording layer by interference of the recording beam incident on the recording layer with the reference beam transmitted by the substrate, reflected by the reflecting layer, and transmitted again by the plastic substrate below the recording layer. At the same time, an interference pattern is formed thereon by the interference of the reference beam incident on the recording layer with the recording beam transmitted by the recording layer and the plastic substrate below the recording layer, reflected by the reflecting layer, and transmitted again by the plastic substrate below the recording layer. Therefore, if the plastic substrate shows birefringent, rotary polarization occurs to each of the recording beam and the reference beam after each light is transmitted by the plastic substrate. As a result, a mismatching occurs between a plane of polarization of the recording beam and that of the reference beam, thereby disadvantageously reducing amplitudes of the interference patterns. The amplitude reduction of the interference patterns causes a reduction in a signal-to-noise ratio (SN ratio, a ratio of an intensity of the signal light to a noise) in recording.

Meanwhile, development of a low birefringent plastic substrate to be used in a currently available optical disk is underway. However, a birefringence of the low birefringent plastic is not low enough. Therefore, even if the low birefringent plastic substrate is used as the substrate of the holographic recording medium, the mismatching occurs again between the plane of polarization of the recording beam and that of the reference beam. As a result, the recorded light cannot be often reproduced and the SN ratio is reduced.

SUMMARY OF THE INVENTION

It is an object of the present invention to at least solve the problems in the conventional technology.

A holographic recording medium according to one aspect of the present invention includes a transparent layer including a servo surface and a light incidence surface facing each other; a reflecting layer located on a servo surface-side of the transparent layer; and a holographic recording layer located on a light incidence-side of the transparent substrate. The transparent layer includes resin films laminated, adjacent resin films differing in stretching direction by 90 degrees.

A holographic recording medium according to another aspect of the present invention includes a transparent layer including a servo surface and a light incidence surface facing each other; a reflecting layer located on a servo surface-side of the transparent layer; and a holographic recording layer located on a light incidence-side of the transparent layer. The transparent layer includes a mixture of a first material having a positive specific birefringence and a second material having a negative specific birefringence, at least one of the first material and the second material being a polymer.

A method of manufacturing a holographic recording medium according to still another aspect of the present invention includes stretching resin films; laminating the stretched resin films so that adjacent resin films differ in stretching direction by 90 degrees, to obtain a transparent sheet; forming tracking grooves on one surface of the transparent sheet; forming a reflecting layer on the one surface of the transparent sheet; and forming a holographic recording layer on another surface of the transparent sheet.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be explained in detail with reference to the accompanying drawings.

In the embodiments of the present invention, a transparent layer which enables polarization matching between a recording beam and a reference beam in a recording layer, on which information is recorded as holograms by changing a refractive index of the recording layer, is arranged on the reflecting layer-side recording layer.

Figure 1:
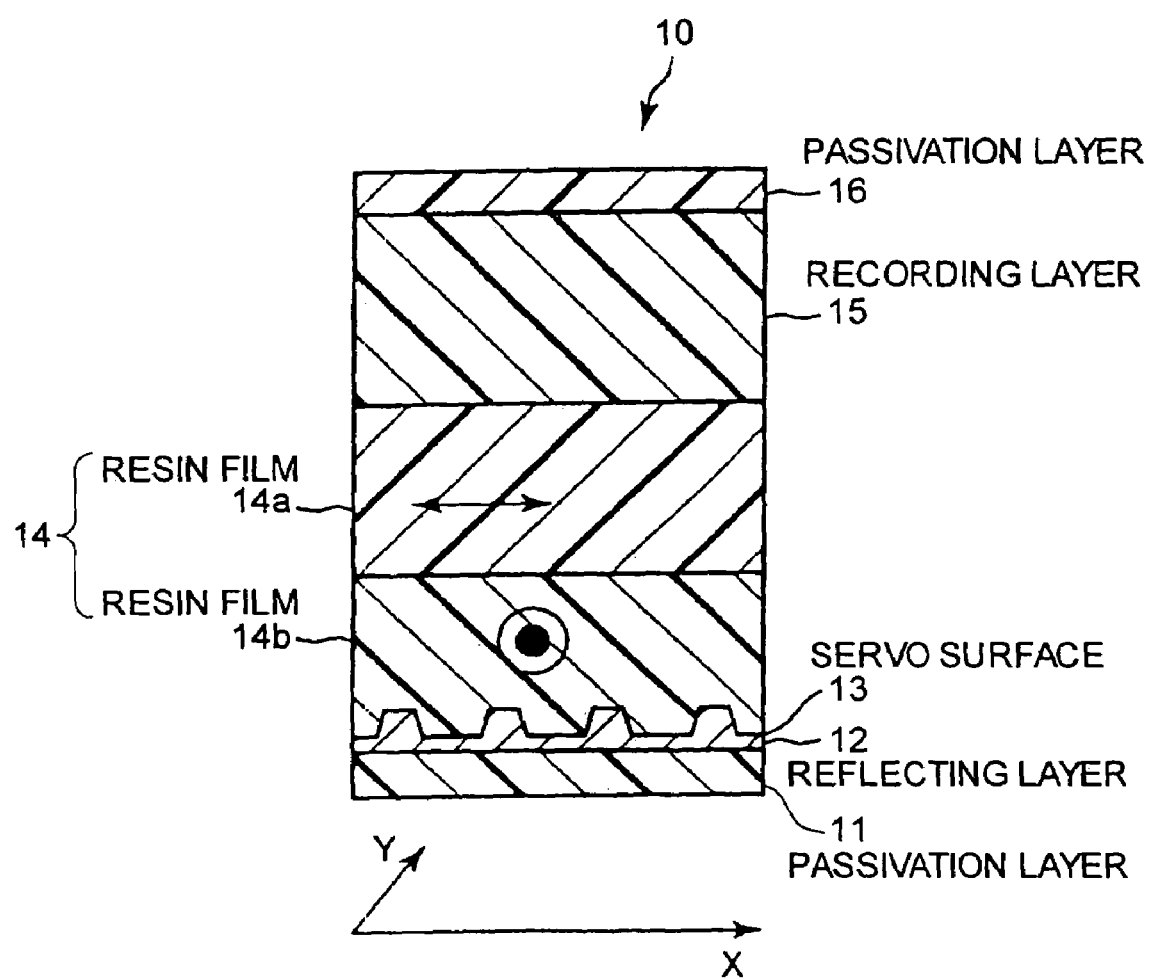
FIG. 1 is a cross-sectional view of a holographic recording medium according to one embodiment of the present invention.

FIG. 1 is a cross-sectional view of a holographic recording medium according to one embodiment of the present invention. In the holographic recording medium 10 shown in FIG. 1, a reflecting layer 12 and a passivation layer 11 for the reflecting layer 12 are sequentially formed on a servo surface 13-side transparent layer 14. A recording layer 15 and a passivation layer 16 for the recording layer 15 are sequentially formed on a light incidence-side transparent layer 14.

Figure 2:
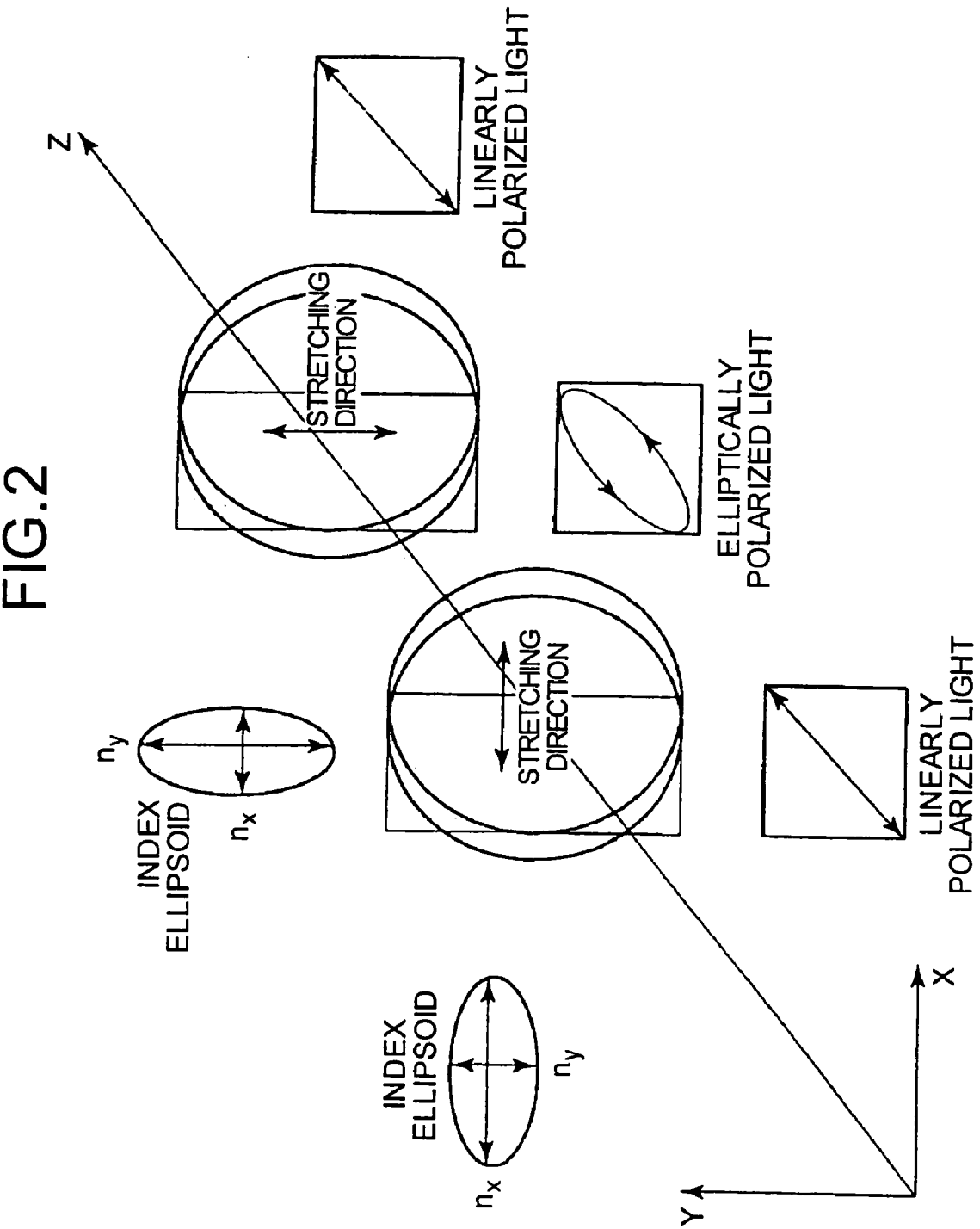
FIG. 2 shows the concept of the present invention.

The transparent layer 14 is manufactured by laminating a plurality of stretched and oriented resin films so that the resin films differ in stretching direction by 90 degrees. Specifically, the transparent layer 14 includes a resin film 14a stretched in an x direction and a resin film 14b stretched in a y direction, whereby the transparent layer 14 functions as a transparent substrate. By thus laminating the resin films 14a and 14b so as to differ in stretching direction by 90 degrees, a change of a light can be returned to a state before the light is incident on the transparent layer 14. FIG. 2 shows this concept. It is assumed that two resin films equal in thickness are laminated so as to differ in stretching direction by 90 degrees. If the light is passed through a first resin film, the light is changed from a linearly polarized light to an elliptically polarized light. If the light is then passed through a second resin film, a phase delay of the light is offset and the elliptically polarized light returns to the linearly polarized light.

If the resin films equal in material are stretched similarly, the phase delay of the light is proportional to the thicknesses of the resin films. It is, therefore, the easiest method for forming the transparent layer by laminating even-numbered resin films equal in thickness so that pairs of the resin films differ in stretching direction by 90 degrees, respectively. In principle, it suffices that the paired films different in stretching direction by 90 degrees are equal in total thickness.

As a material of the resin films 14a and 14b, so-called engineering plastic transparent and having a high mechanical strength can be used. The engineering plastic may be either a polymer having a positive birefringence by which a refractive index of the polymer is high in an orientation direction, or a polymer having a negative birefringence opposite to the positive birefringent polymer. Representative polymers include polycarbonate resins, polyacrylate, methyl polymethacrylate, polystyrene, poly(ethylenedimethyl acrylate), polydiethylene glycolbis(allyl carbonate), polyphenylene oxide, polyethylene terephthalate, MS-resin, AS-resin, poly(cyclohexyl methacrylate), poly(4-methyl-1-pentene), and CR39. The material of the resin films 14a and 14b is selected in light of a refractive index and a volume thermal expansion coefficient of a material of the hologram recording medium. If tracking grooves are formed in the hologram recording medium by stamping, the material of the resin films 14a and 14b is selected preferably in light of the tracking grooves as well as the refractive index and the volume thermal expansion coefficient of a material of the hologram recording medium.

Each of the resin films to be stretched may contain an additive such as a low molecular weight compound. Such additives may include plasticizers, crystallits having a birefringent property, and low molecular compounds. As the plasticizers, for example, tricresyl phosphate, butyl phthalate, dioctyl phthalate, vinyl polymers, and polyvinyl chloride can be used. As the crystallits having a birefringent property, for example, all the crystals except for cubic crystals can be used, and as the low molecular compounds, for example those having asymmetric carbons and metal complex compounds can be used.

In a step of stretching each resin film, a temperature of the polymer is increased to a glass transition temperature or higher. At the glass transition temperature or higher, high molecular chains are plastically deformed. The deformation does not occur at a temperature lower than the glass transition temperature. The deformation disappears when a stress is eliminated. This phenomenon is referred to as "stress birefringence". In the embodiments of the present invention, the transparent layer 14 including the resin films having induced orientation and birefringence is used as the substrate.

The reflecting layer 12 is formed on the servo surface 13 of the transparent layer 14. A material of the reflecting layer 12 is preferably a total reflection thin film material relative to operating wavelengths. If the operating wavelengths are, for example, 400 to 780 nanometers, one of Al alloy and Ag alloy is preferably use as the material of the reflecting layer 12. If the operating wavelengths are, for example, 650 nanometers or more, one of Au, Cu alloy, TiN and the like as well as the Al alloy and the Ag alloy. A thickness of the reflecting layer 12 is determined as a thickness which induces total reflection. The thickness is preferably 50 nanometers or more, more preferably 100 nanometers or more.

The passivation film 11 consisting of a transparent oxide such as $SiO_2$ or plastic such as polycarbonate having a high mechanical strength is formed on a surface of the reflecting layer 12.

The recording layer 15 is formed on the light incidence-side transparent layer 14. In this embodiment, the recording layer 15 is an organic recording layer on which interference patterns can be recorded. The recording layer 15 is made of a material which undergoes a change mainly in refractive index by a change that occurs after light irradiation. Examples of the material of the recording layer 15 include (i) photopolymers polymerized by a chemical reaction induced by the irradiation of the light, (ii) organic photorefractive materials exhibiting a photorefractive effect, and (iii) photochromic materials.

The photopolymers include matrix materials, monomers and photoinitiators. The photopolymers may further include acid generators, radical generators, coloring matters, oligomers, and reaction inhibitors.

As the matrix materials of the photopolymers, for example various vinyl polymers such as polyvinyl acetate having an ester group, polycarbonate polyacrylate, norbornene series resins, polymethyl methacrylate, cellulose acetate butyrate, and polystyrene methyl methacrylate can be used. The content of the matrix material is, for example, 20 to 80 wt % relative to the total amount of the photopolymer.

The matrix material may be formed by a polymeric compound which is liquid at an ordinary temperature and a hardening agent for the polymeric compound. A formation reaction of this matrix occurs when solutions for forming the recording layer are mixed, and is finished when the recording layer is formed. Examples of the polymeric compound liquid at the ordinary temperature include epoxy compounds, ether compounds, ester compounds, and vinyl compounds. To form the matrix, one or more of these polymeric compounds are used. After the polymeric compounds reacts with the hardening agent, epoxy resin, urethane resin, acrylate resin, urethane acrylate resin, or the like is formed.

The epoxy compounds may include, for example, 1,2,7,8-diepoxyoctane, 1,4-bis(2,3-epoxypropoxyperfluoroisopropyl)cyclohexane, 3,4-epoxycyclohexylmethyl-3',4'-epoxycyclohexanecarboxylate, 3,4-epoxycyclohexyloxysilane, 1,2,5,6-diepoxy-4,7-methanoperhydroindene, 2-(3,4-epoxycyclohexyl)-3',4'-epoxy-1,3-dioxane-5-spirocyclohexane, 1,2-ethylenedioxybis(3,4-epoxycyclohexylmethane), 4',5'-epoxy-2'-methylcyclohexylmethyl-4,5-epoxy-2-methylcyclohexane carboxylate, ethyleneglycol-bis(3,4-epoxycyclohexane carboxylate), bis(3,4-epoxycyclohexylmethyl) adipate, and di-2,3-epoxycyclopentyl ether. The ether compounds may include, for example, diglycerol polyglycidyl ether, pentaerythritol polyglycidyl ether, sorbitol polyglycidyl ether, trimethylolpropane polyglycidyl ether, resorcin diglycidyl ether, 1,6-hexanediol diglycidyl ether, polyethyleneglycol diglycidyl ether, phenylglycidyl ether, para-tert-butylphenylglycidyl ether, dibromophenylglycidyl ether, dibromoneopentylglycol diglycidyl ether, 1,6-dimethylolperfluorohexanediglycidyl ether, and 4,4'-bis(2,3-epoxypropoxyperfluoroisopropyl)diphenyl ether. The ester compounds may include, for example, adipic acid diglycidyl ester and orthophthalic acid diglycidyl ester.

The vinyl compounds may include, for example, vinyl-2-chloroethyl ether, vinyl-n-butyl ether, triethyleneglycol divinyl ether, 1,4-cyclohexanedimethanol divinyl ether, trimethylolethane trivinyl ether, and vinylglycidyl ether.

The curing agent may include, for example, primary or secondary aliphatic amines and aromatic amines, and one or more kinds thereof are used. The curing agent is preferably optically inactive. The aliphatic amines may include for example, ethylenediamine, diethylenetriamine, triethylenetetramine, tetraethylenepentamine, dipropylenediamine, diethylaminopropylamine, hexamethylenediamine, menthenediamine, isophorodiamine, diaminodicyclohexylmethane, and xylenediamine. The aromatic amines may include, for example, methaphenylenediamine, diaminodiphenylmethane, and diaminodiphenylsulfone.

As the monomers of photopolymers, molecules having an acrylate reactive group can be used. Included are, for example, isobonyl acrylate, phenoxyethyl acrylate, diethylene glycol, monoethylether acrylate, and ethyl acrylate. Further, vinyl benzoate, vinyl 3,5-dichlorobenzoate, and vinyl 1-naphthoate may be added. In order to increase refractive index modulation, acrylates such as 2-naphtho-1-oxyethyl acrylate and 2-carbazol-9-ylethyl acrylate may be used. In this case, low refractive index acrylates such as (trimethylsilyloxy)diemethylsilylpropyl acrylate and (perfluorocyclohexyl)methyl acrylate may be included. Moreover, N-vinylcarbazole may be added. In addition, polyfunctional acrylates such as pentaerythritol triacrylate, trimethylpropane triacrylate, dipentaerythritolpentahexaacrylate, ditrimethylolpropane tetraacrylate, and pentaerythritol tetraacrylate may be used. The content of the monomer in the photopolymer is approximately 5 to 50 wt % relative to the total amount of the photopolymer.

As the photoinitiator for the photopolymer, for example, materials which cause radical polymerization by irradiation with light and those which cause cation polymerization. In order to relax the change in volume during polymerization, components which diffuse in the reverse direction with respect to the polymerizable components may be added. Alternatively, compounds having an acid cleavage structure may be added separately. The formation of membrane of a medium containing a low molecular component requires a liquid-retention structure in the medium in some cases. Due to cleavage caused by increasing the number of molecules in the material, expansion may occur, and there is a mechanism that constriction induced by the polymerization of monomers is compensated at least partially by the change in the volume. Thus, those having a small change in volume may be employed.

The photoinitiator for the photopolymer is specifically a material having sensitivity to recording beam. For example, bis(2,6-difluoro-3-pyrrolylphenyl)titanocene, bis(2,4,6-trimethylbenzoyl)-phenylphosphine oxide, bis(2,4-cyclopentadien-1-yl-bis(2,6-difluoro-3-(1H-pyrrol-1-yl)-phenyl)-titanium, a mixture of bis(2,6-dimethoxybenzoyl)-2,4,4-trimethyl-pentylphosphine oxide and 1-hydroxycyclohexyl-phenyl-ketone, 2-methyl-1[4-(methylthio) phenyl]-2-morpholinopropan-1-one, and a radical generator such as 2-benzyl-2-dimethylamino-1-(4-morpholinophenyl) butanone-1 can be used. The content of the photoinitiator of the photopolymer can be selected appropriately depending on the wavelength of recording beam, film thickness of the recording layer and light absorbing amount of the photoinitiator, and is for example, approximately 0.1 to 5.0 wt % with respect to the total amount of the photopolymer.

As the acid generator for the photopolymer, for example, aryldiazonium salts, diaryliodonium salts, triarylsulfonium salts, triarylselenonium salts, dialkylphenacylsulfonium salts, dialkyl-4-hydroxyphenylsulfonium salts, sulfonic acid esters, and iron arene compounds can be used.

The radical generator for the photopolymer includes, for example, aromatic carbonyl compounds, particularly α,α-dimethoxy-α-phenylacetophenone.

The coloring matter for the photopolymer includes a large number of substances such as azide compounds, 5-nitroacenaphthene, 1,2-benzanthraquinone, 1-nitro-4-acetylaminonaphthalene, methylene blue, safranine O, Malachite Green, cyanine dyes, and Rhodamine dyes.

The oligomer for the photopolymer includes, for example, polyfunctional acrylate resins having a reactive group at both terminal of principal chain of the polymer, and epoxy resins.

The reaction inhibitor for the photopolymer includes, for example, (i) a radical deactivator such as oxygen, (ii) a radical scavenger such as butylhydroxyanisole, N-tert-butyl-α-phenylnitrone (PBN), and polyphenol compounds, and (iii) peroxides such as tert-butyl hydroperoxide.

If the auxiliary components such as the coloring matter and the reaction inhibitor are contained in the photopolymer by about 0.1 wt %, a good effect can be often expected. If the auxiliary components are contained excessively, a sensitivity of the recording layer may possibly be deteriorated. A content of the auxiliary components is, therefore, preferably within about 0.1 wt %.

The photopolymer is obtained by agitating and mixing these materials. By casting a resultant mixture, the recording layer 15 can be formed.

If the photorefractive polymer, which is the organic photorefractive material, is used as the material of the recording layer 15, the recording layer 15 can be formed by evaporating a solvent of a solution containing components (a charge-generating material, a charge transport material, and a nonlinear optical material) of the photorefractive polymer. Each component may be either a molecular material or a polymeric material as long as the material exhibits a photorefractive effect. The recording layer 15 may be formed by, for example, heating the component mixture, and quickly cooling the mixture without using the solvent.

The charge generating material, as one of the components of the photorefractive polymer, needs to absorb the recording beam so as to generate electric charges. However, if a charge generating material having a very high optical density relative to the recording beam is used, the recording beam does not often reach the charge generating material within the recording layer 15. The optical density ($cm^{-1}$) of the resultant recording layer 15 is, therefore, preferably in a range of $10^{-5}$ to ten.

The charge generator includes, for example, (1) phthalocyanine coloring matters/pigments of metal phthalocyanine, metal-free phthalocyanine, or derivatives thereof, and naphthalocyanine colorants/pigments, (2) azo series coloring matters/pigments such as monoazo, disazo, and trisazo, (3) perylene series dyes and pigments, (4) indigo series dyes and pigments, (5) quinacridone series dyes and pigments, (6) polycyclic quinone series dyes and pigments such as anthraquinone and anthoanthrone, (7) cyanine series dyes and pigments, (8) charge transfer complexes comprised of an electronic acceptor and electron-donating substance typified by TTF-TCNQ, (9) azulenium salts, and (10) flarene typified by $C_{60}$ and $C_{70}$ or methanoflarene which is a derivative of flarene. Some of the charge transfer complexes are suitable for the charge-generating material in this embodiment.

The charge transport material, as one of the components of the photorefractive polymer, is a material which has a charge transport capability of transporting holes or electrons. The charge transport material may be a molecular material, a polymeric material, or a copolymer of a plurality of polymers. The charge transporting material includes, for example, (1) nitrogen-containing cyclic compounds (heterocyclic compounds) such as indole, carbazole, oxazole, isooxazole, thiazole, imidazole, pyrazole, oxadiazole, pyrazoline, thiadiazole, and triazole, derivatives thereof, or compounds having them at the principal chain or side chain, (2) hydrazone compounds, (3) triphenylamines, (4) triphenylmethanes, (5) butadienes, (6) stilbens, (7) quinone compounds such as anthraquinonediphenoquinone or derivatives thereof, or compounds having these at the principal chain or side chain, (8) flarene such as $C_{60}$ and $C_{70}$, and derivatives thereof. Further, (1) π-conjugated polymers and oligomers such as polyacetylene, polypyrrole, polythiophene, and polyaniline, or (2) σ conjugated polymers and oligomers such as polysilane and polygermane, and (3) polycyclic aromatic compounds such as anthracene, pyrene, phenanthrene, and coronene.

If the recording layer 15 is an uppermost surface, the passivation layer 16 consisting of a transparent material is preferably provided for mechanical protection. The passivation layer 16 may consist of a bulky glass material, a transparent resin material, or a transparent thin film material. If a film having a high sensitivity photobleaching property or a film having a photochromic property is used as the passivation layer 16, it is possible to prevent the holographic recording layer 16 from being deteriorated by a natural light, and thereby preferably improve a shelf life of the recording layer 16. Before the recording beam is recorded on the recording layer 15, the recording layer 15 is in a metastable state in which monomers are dispersed in the recording layer 15. In this state, the recording layer 15 is confronted with the deterioration caused by the natural light. After the recording beam is recorded, the recording layer 15 is in a stable state in which polymerization of the monomers is finished according to an interference pattern. Therefore, even if the passivation layer 16 is not formed, a disadvantage of shortening of an archival life does not emerge.

Various changes and modifications can be made of the holographic recording medium according to this embodiment of the present invention. For example, as shown in a holographic recording medium 18 shown in FIG. 3, another transparent layer 17 may be arranged between the recording layer 15 and the passivation layer 16. Similarly to the transparent layer 14 used as the substrate, this transparent layer 17 is composed by a laminated body of a plurality of resin films which are laminated so as to differ in stretching direction by 90 degrees. Namely, a resin film 17a is stretched in the x direction, and a resin film 17b is stretched in the y direction. If the transparent layer 17 is additionally provided, the SN ratio which is the ratio of the signal light to the noise is improved.

Figure 3:
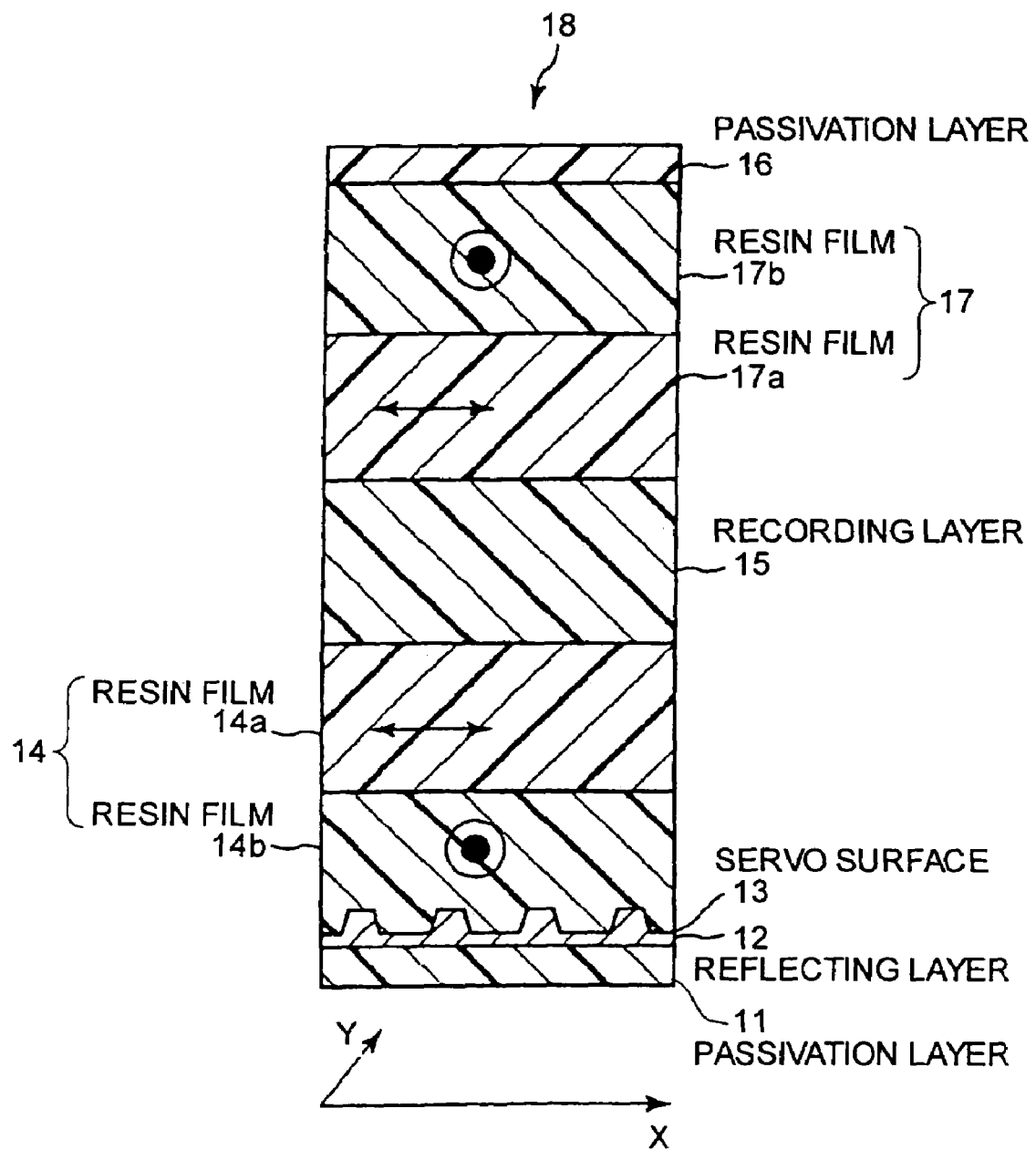
FIG. 3 is a cross-sectional view of a holographic recording medium according to another embodiment of the present invention.
Figure 4:
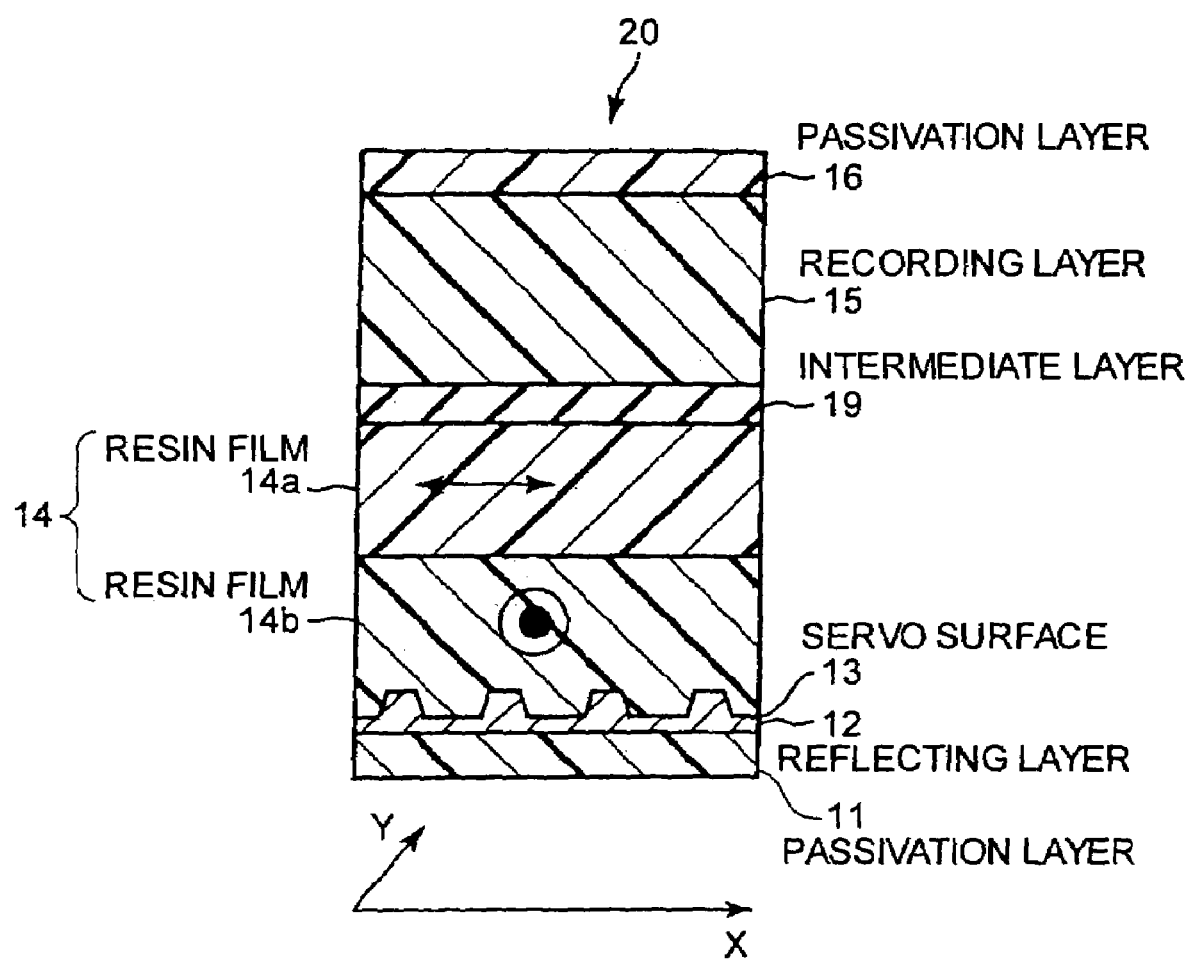
FIG. 4 is a cross-sectional view of a holographic recording medium according to still another embodiment of the present invention.

Alternatively, as shown in a holographic recording medium 20 shown in FIG. 4, an intermediate layer 19 may be arranged between the transparent layer 14 and the recording layer 15. Further, if the transparent layer 17 is provided as shown in FIG. 3, another intermediate layer 19 may be arranged between the transparent layer 17 and the recording layer 15 besides the intermediate layer 19 between the transparent layer 14 and the recording layer 15. By thus providing the intermediate layers 19, diffusion of low molecular weight compounds from the transparent layers 14 and 17 to the recording layer 15 and from the recording layer 15 to the transparent layers 14 and 17 can be suppressed. The intermediate layer 19 is obtained by forming a film on the transparent layer 14 or 17 by sputtering or the like, and the recording layer 15 is formed on the intermediate layer 19.

The intermediate layer 19 can be formed y a material selected from a group consisting of, for example, Ca—F, $MgF_2$, $CaF_2$, $PbF_2$, $BaF_2$, CsI, CsBr, MgO, $Al_2O_3$, $BaF_2$, $ZrF_4$, Si—O, Si—N, Al—O, Al—N, Ti—O, Y—O, Zr—O, Zr—N, Cr—O, Ta—O, In—O, ZnO, Sn—O, B—N, Si—C, Ca—F, Zn—S, ZnS—$SiO_2$, $ZrO_2$, $BaTiO_3$, $TiO_2$, $Y_2O_4$, $CeO_2$, Hf, TeO, and diamond. A thickness of the intermediate layer 19 is not limited to a specific one. However, in view of requirements of not allowing mutual diffusion of matters between upper and lower layers, and of sufficiently transmitting the light, the thickness of the intermediate layer 19 is preferably about 10 to 500 nanometers.

Figure 5:
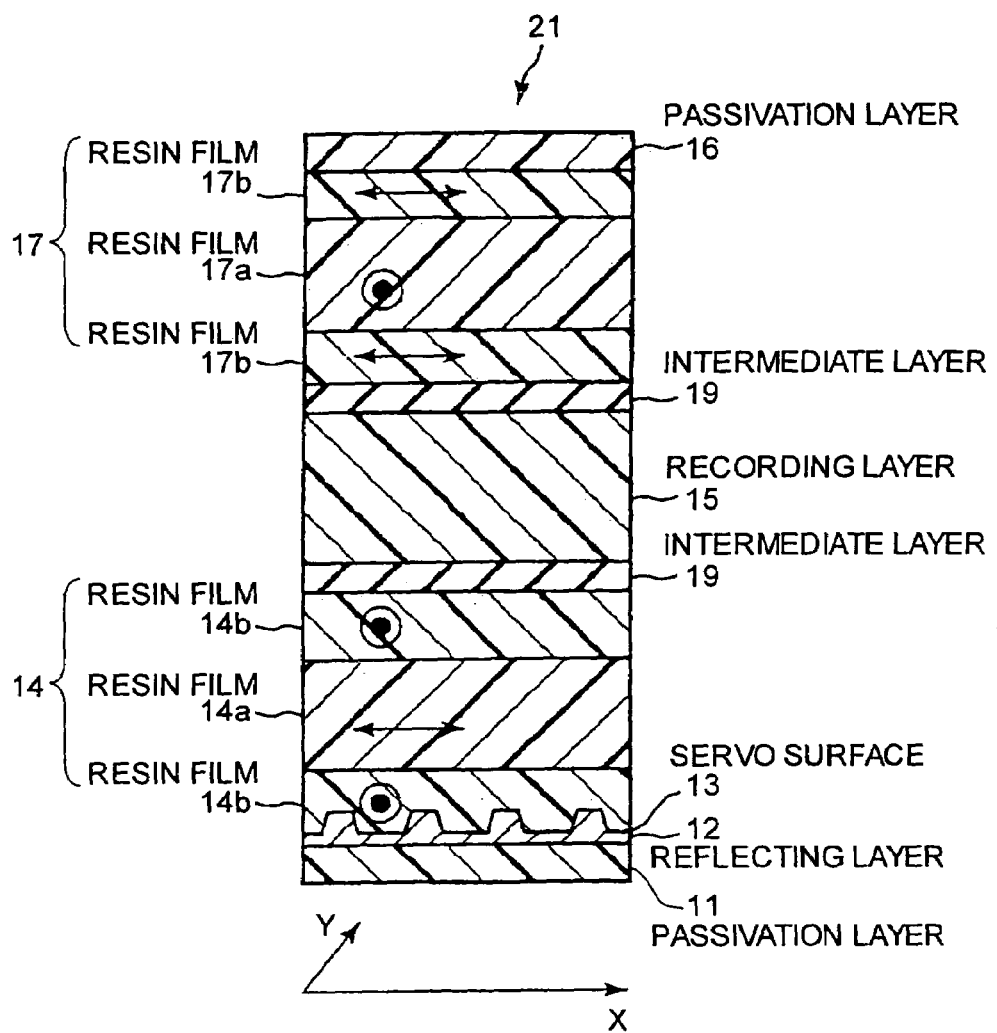
FIG. 5 is a cross-sectional view of a holographic recording medium according to still another embodiment of the present invention.

The number of resin films that constitute each of the transparent layers 14 and 17 is not limited to an even number but may be an odd number. In principle, it suffices that the total thicknesses of the respective pairs of two types of films different in stretching direction by 90 degrees are equal. For example, as shown in the holographic recording medium 21 shown in FIG. 5, two resin films 14b (17a) of 20 micrometers stretched in a certain direction may be prepared, and the two resin film 14a (17b) of 40 micrometers different in stretching direction from that of the resin films 14b (17a)

may be put between the resin films 14b (17a). However, the resin films should be equal in stretching degree and in birefringence.

Figure 6:
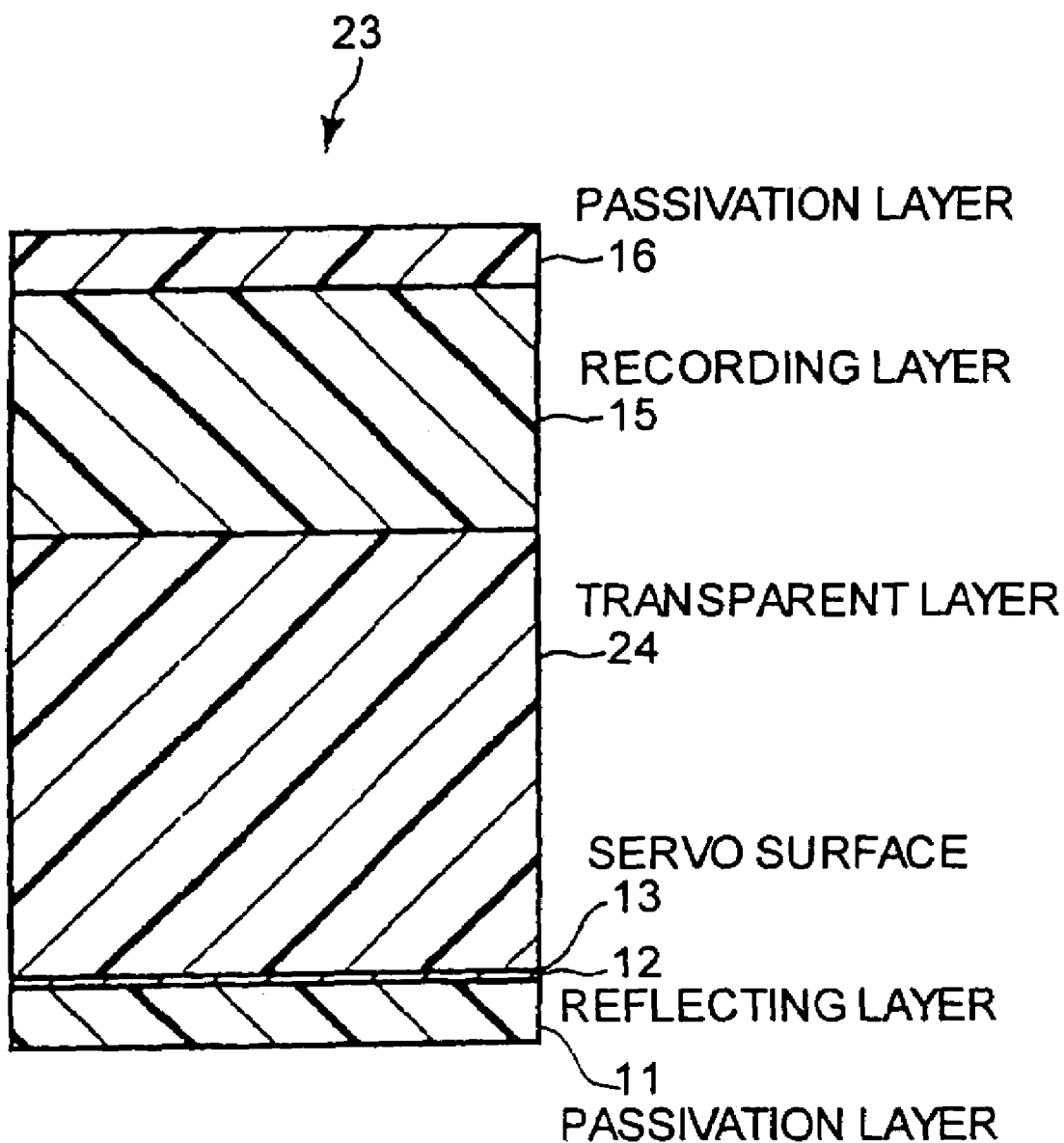
FIG. 6 is a cross-sectional view of a holographic recording medium according to still another embodiment of the present invention.

Any one of the holographic recording mediums explained above can be manufactured by forming a sheet by laminating a plurality of resin films stretched and oriented so that each pair of resin films differ in stretching direction by 90 degrees, forming tracking grooves in the sheet, and cutting the sheet into disks;

FIG. 6 is a cross-sectional view of the configuration of a holographic recording medium according to another embodiment of the present invention.

In a holographic recording medium 23 shown in FIG. 6, a transparent layer 24 between the reflecting layer 12 and the recording layer 15 can be formed by injection-molding a mixture of materials each having a positive specific birefringence and materials each having a negative specific birefringence. This injection molding, in particular, can further facilitate obtaining the transparent layer 24 having zero-birefringence at a lower cost, and selecting the transparent layer 24 equal in refractive index to the recording layer 15. The mixture of the materials each having the positive specific birefringence and the materials each having the negative specific birefringence can be formed by either the injection molding or by bonding and cutting of the sheet. The holographic recording medium 23 is equal to the holographic recording medium 10 shown in FIG. 1 except for use of this transparent layer 24.

Examples of the material having the positive specific birefringence of the transparent layer 24 include polymers, organic crystals, and inorganic crystals. Polymers having positive intrinsic birefringent index include, for example, polyvinyl chloride, polyethylene, polyvinylidene fluoride (PVDF), polytetrafluoroethylene (PTFE), polychlorotrifluoroethylene (PCTFE), polyphenylene oxide, polycarbonate, polyarylate, and indene derivatives. The polymers having a phenyl group at the principal chain are polymers having positive intrinsic birefringent index in most cases.

As the organic crystals; for example, difluoromethane, polyvinylidene fluoride, chlorobenzene, fluorobenzene, aniline, nitrobenzene, nitroaniline, nitropyridine oxide, and dinitroaniline can be used.

As the inorganic crystals, for example, crystals having high anisotropy and high refractive index in the lengthwise direction of the crystal such as needle crystals can be used. The crystals having refractive index anisotropy include, for example, $LiNbO_3$, $BaTiO_2$, SBN, KTN, KNSBN, BSO, BGO, GaAs, InP, and CdTe.

The material having the positive specific birefringence means a material having optical anisotropy. If the material is a polymer, the refractive index thereof in a main chain direction is higher than that in a direction orthogonal to the main chain direction. If the material is a needle-like crystal, the refractive index thereof in a longer crystal direction is higher than that in a direction orthogonal to the longer crystal direction.

Examples of the polymer having the negative specific birefringence include polymethyl methacrylate (PMMA) and polystyrene (PST). The material having the negative specific birefringence is a material having optical anisotropy similarly to the material having the negative specific birefringence. If the material is a polymer, the refractive index thereof in a main chain direction is lower than that in a direction orthogonal to the main chain direction. If the material is a needle-like crystal, the refractive index thereof in a longer crystal direction is lower than that in a direction orthogonal to the longer crystal direction. Examples of the needle-like crystal having the negative specific birefringence include strontium carbonate and sodium carbonate.

A mixture ratio of the materials each having the positive specific birefringence to the materials each having the negative specific birefringence is selected so that the transparent layer 24 has zero-birefringence. However, the polymer should be selected as the material having the positive birefringence or that having the negative specific birefringences. This is because the transparent layer 24 is required to have a high adhesibility to the recording layer 15 according to the present invention. The number of materials high in birefringence Δn per unit volume is set to be smaller than the number of materials low in birefringence Δn per unit volume.

If the recording medium is disk shaped and recording and reproduction are carried out while rotating the recording medium, the stress birefringence of the transparent layer 24 should be taken into consideration. The stress birefringence means a birefringence that appears when a material is applied with a stress to thereby extend polymer chains thereof, and when groups that constitute the chains are oriented. The stress birefringence of the transparent layer 24 according to the embodiments of the present invention can be suppressed low. This is because a photoelastic coefficient of the transparent layer 24 can be suppressed low. Examples of a combination of materials having low stress birefringences include PMMA:PVDF=80:20, PMMA:PEO=65:35, and PS: polyphenylene oxide (PPO)=71:29.

Figure 7:
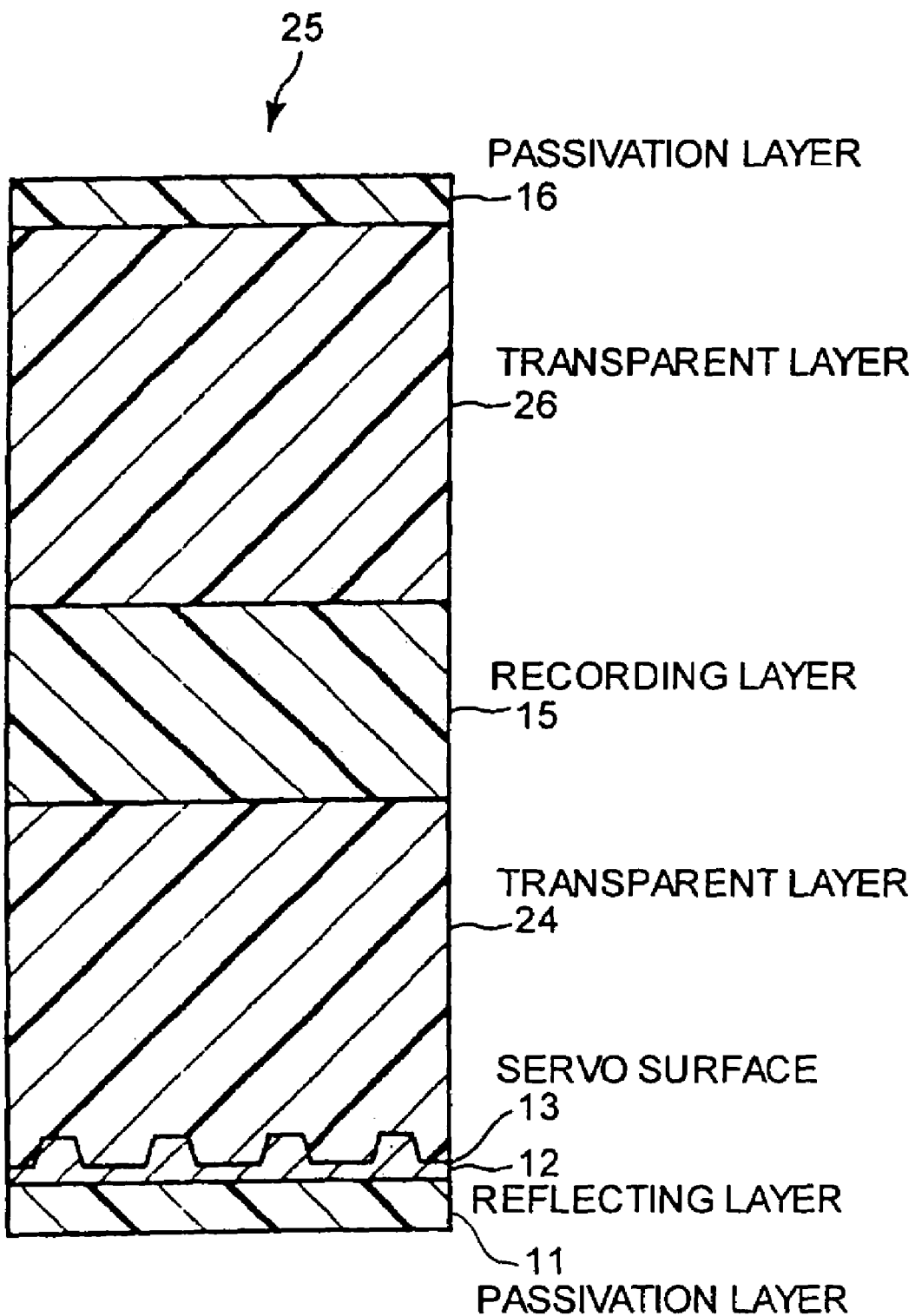
FIG. 7 is a cross-sectional view of a holographic recording medium according to still another embodiment of the present invention.
Figure 8:
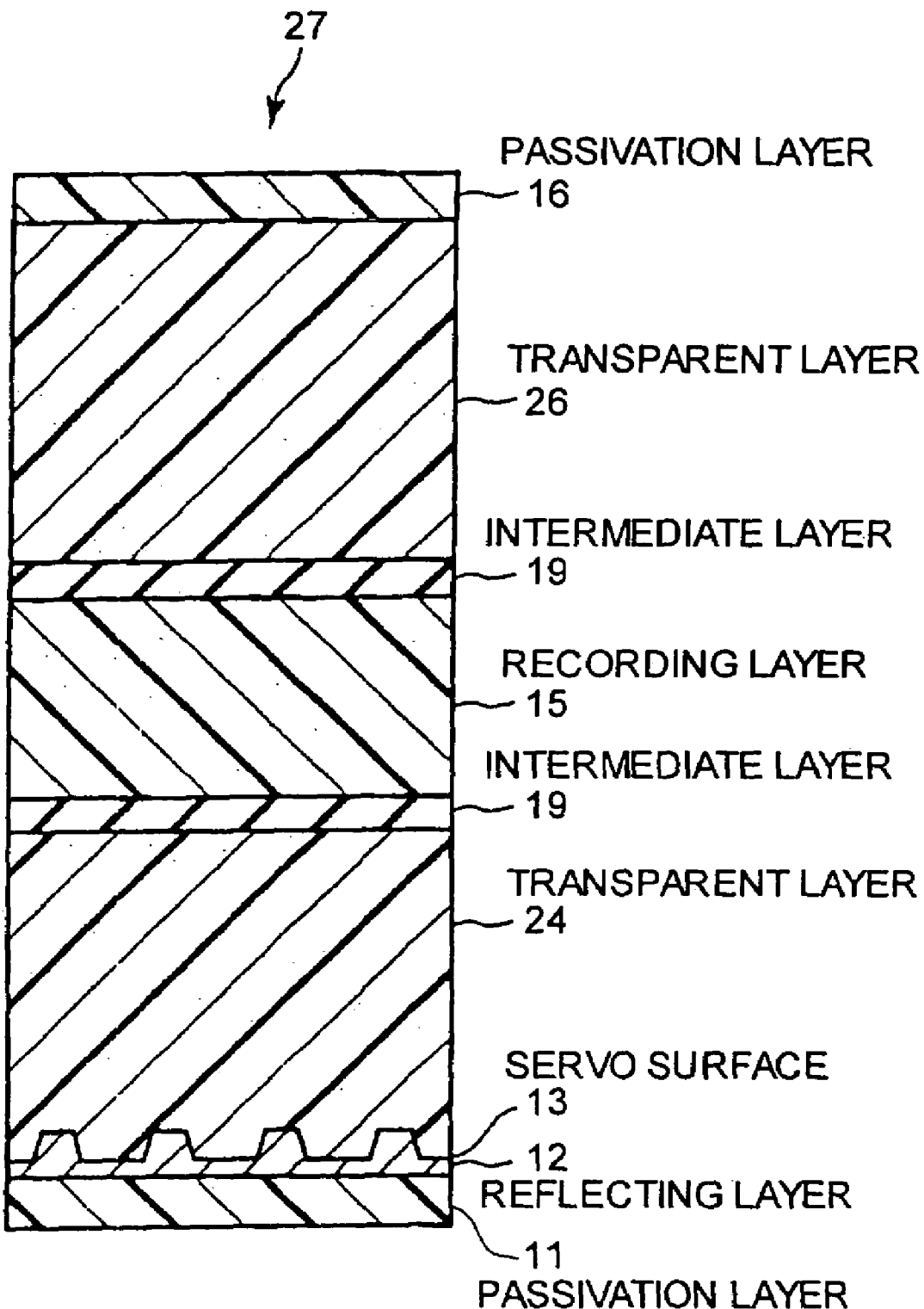
FIG. 8 is a cross-sectional view of a holographic recording medium according to still another embodiment of the present invention.

Various changes and modifications can be made of the holographic recording medium 23 shown in FIG. 6. As shown in a holographic recording medium 25 shown in FIG. 7, a transparent layer 26 similar to the transparent layer 24 can be arranged between the recording layer 15 and the passivation layer 16. As shown in a holographic recording medium 27 shown in FIG. 8, intermediate layers 19 may be arranged between the recording layer 15 and the transparent layers 24 and 26, respectively. By arranging the transparent layer 26 and the intermediate layers 19, the effect already explained can be attained.

Figure 9A:
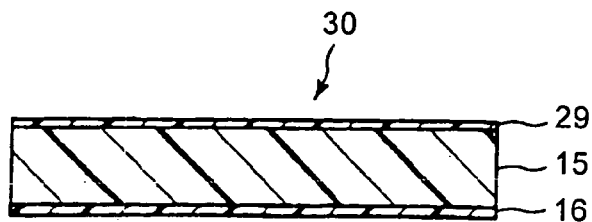
FIG. 9 is a cross-sectional view of a forming method of holographic recording medium according to one embodiment of the present invention.

The holographic recording medium according to this embodiment of the present invention can be manufactured by, for example, casing, bonding (roll bonding), or the like. A holographic recording medium manufacturing method using the roll bonding will be explained with reference to FIGS. 9A to 9C. As shown in FIG. 9A, the recording layer 15 is cast on the passivation layer 16, and an adhesive layer 29 is sprayed on the recording layer 15, thereby forming a recording layer sheet 30. Examples of an adhesive include an adhesive using a volatile solvent, a hot melt adhesive using thermoplastic resin, a chemical reaction induced adhesive, and a photocurable material. As the adhesive used to bond the plastic substrate (transparent substrate) to the intermediate layer 19 (consisting of the inorganic compound, metal, or the like) according to the present invention, epoxy resin, urethane adhesive, the second generation acrylic adhesive, or the like is preferably used.

Figure 9B:
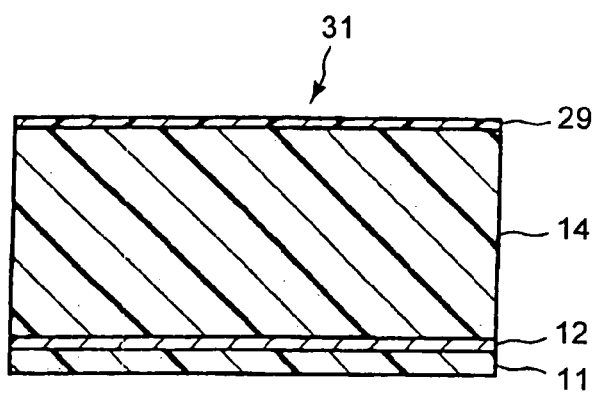

As shown in FIG. 9B, the reflecting layer 12 and the passivation layer 11 are formed on one surface of the transparent layer 14 by sputtering, and the adhesive layer 29 is sprayed onto the other surface of the transparent layer 14, thereby forming a plastic sheet 31.

Figure 9C:
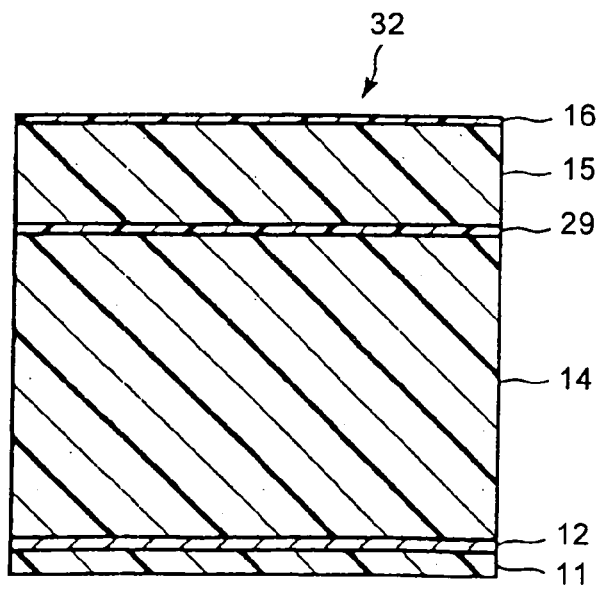

A photopolymer sheet 30 is bonded to the plastic sheet 31 via the adhesive layer 29, thereby obtaining the laminating structure shown in FIG. 9C. The sheets 30 and 31 can be bonded by light irradiation, pressurization, or heating. For heating, an ordinary method such as a light irradiation method or a Joule heat application method can be used.

A method for recording information on the holographic recording medium 20 shown in FIG. 4, a method for reproducing information recorded on the holographic recording medium 20, a recording and reproduction apparatus capable of carrying out such recording and reproduction, and a method for variously controlling the holographic recording medium 20 will next be explained. Although the holographic recording medium 20 shown in FIG. 4 is taken as an example, the same recording method, reproduction method, and control method can be applied to the other holographic recording mediums.

Figure 10:
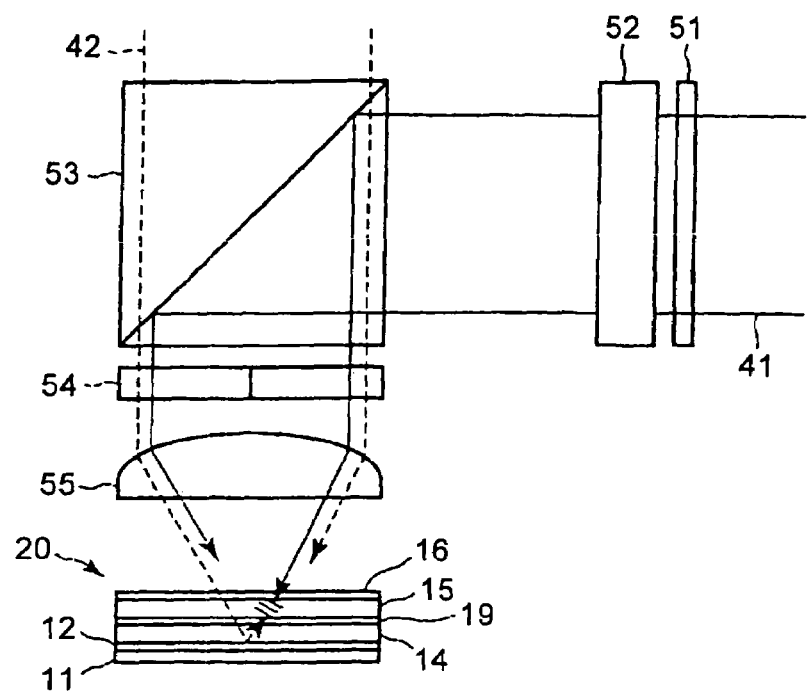
FIG. 10 is a schematic diagram of one example of the method for recording information on the holographic recording medium.

FIG. 10 is a schematic diagram of one example of the method for recording information on the holographic recording medium 20 shown in FIG. 10. In FIG. 10, a solid line 41 denotes the recording beam (S-polarized light), and a broken line 42 denotes the reference beam (P-polarized light).

An incidence system, which the recording beam 41 is incident on, includes a shutter 51 and a spatial light modulator (SLM) 52. By driving the SLM 52 to correspond to an information signal, the information signal is carried by the recording beam 41. The S-polarized recording beam 41 is then incident on a polarization beam splitter (PBS) 53, a progress direction of which is changed to a direction of the recording medium 20 by 90 degrees, and the recording beam 41 is emitted from the PBS 53. The recording beam 41 is then passed through a gyrator 54.

In the example of FIG. 10, the half-split gyrator 54 is set so that a right half rotates a plane of polarization by +45 degrees, and so that a left half rotates the plane of polarization by −45 degrees. Therefore, in the S-polarized recording beam 41, the plane of polarization of the light passed through the right half of the gyrator 54 is rotated by +45 degrees, and that of the light passed through the left half rotates the plane of rotation by −45 degrees. Thereafter, the recording beam 41 is passed through an objective 55, and converged on an upper surface of the reflecting layer 12 of the holographic recording medium 20.

The P-polarized reference beam 42 is incident on the PBS 53 from above, and passed straight through the PBS 53. In the reference beam 42, the plane of polarization of the light passed through the right half of the gyrator 54 is rotated by P+45 degrees and that of the light passed through the left half is rotated by P−45 degrees. Thereafter, similarly to the recording beam 41, the reference beam 42 is passed through the objective 55, and converged on the upper surface of the reflecting layer 12 of the holographic recording medium 20.

The recording beam 41 having the plane of polarization at S+45 degrees matches the reference beam 42 having the plane of polarization at P−45 degrees. As typically shown in FIG. 10, therefore, an interference pattern is formed in the recording layer 15.

In FIG. 10, for brevity, only the interference pattern formed by an interference between the recording beam 41 having the plane of polarization at S+45 degrees and the reference beam 42 having the plane of polarization at P−45 degrees is shown. Actually, the recording beam 41 having the plane of polarization at S−45 degrees matches the reference beam 42 having the plane of polarization at P+45 degrees. Therefore, an interference pattern according to the information signal is formed. FIG. 10 also shows a state in which an incident light of the recording beam 41 at S+45 degrees interferes with a reflected light of the reference beam 42 at P−45 degrees in a right portion of the recording layer 15. In a left portion of the recording layer 15, an incident light of the recording beam 41 at S+45 degrees similarly interferes with a reflected light of the reference beam 42 at P−45 degrees. Accordingly, duplex signals resulting from the SLM 52 are recorded in the recording layer 15.

Since the recording beam 41 and the reference beam 42 are adjusted to be equal in optical path length, a difference between the recording beam 41 and the reference beam 42 in optical path is hardly present. Therefore, the information signal from an upper portion of the SLM 52 (incident on the right half of the gyrator 54) and the information signal from a lower portion of the SLM 52 (incident on the left half of the gyrator 54) are recorded substantially at the same location of the recording layer 15, or recorded left and right of the recording layer 15 once, respectively in the configuration shown in FIG. 10. Since the upper and the lower portions of the SLM 52 differ in information pattern, the signals from the SLM 52 are often duplex recorded. However, both the upper and the lower portions of the SLM 52 enable forming equal interference patterns left and right, respectively. With this method, therefore, a signal quality is not inferior to that of the angular multiplexing reproduction method in the transmission geometry.

Figure 11:
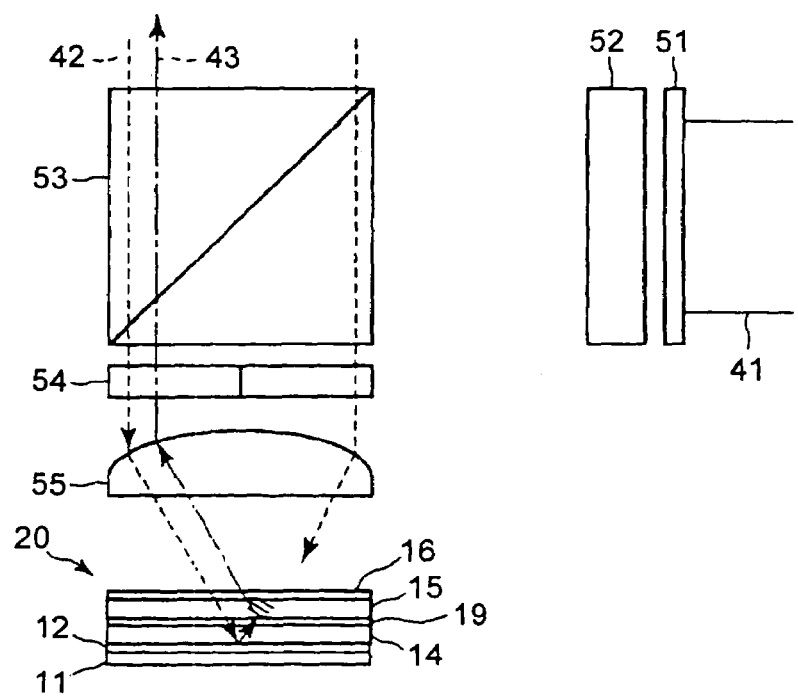
FIG. 11 is a schematic diagram of one example of the method for reproducing the information recorded on the holographic recording medium.

FIG. 11 is a schematic diagram of one example of the method for reproducing the information recorded on the holographic recording medium 20.

During reproduction, the shutter 51 located in the incidence system for the recording beam 41 is closed. It suffices that the shutter 51 functions to prevent incidence of the recording beam 41 on the recording medium 20. As the shutter 41, a liquid crystal shutter, an S-polarized light reflecting plate, or a total reflection plate can be used. During reproduction, only the P-polarized reference beam 42 is made incident.

For brevity, FIG. 11 shows the information reproduction method while paying attention to the reproduction reference beam 42 incident on a left part of the PBS 53. The incident P-polarized light is passed through the left half of the gyrator 54, thereby rotating the plane of polarization of the P-polarized light by P−45 degrees, and the resultant P-polarized light is incident on the recording medium 20 on which the interference pattern is recorded, through the objective 55. In the example of FIG. 11, a state in which the reflected light of the reference beam 42 at P−45 degrees is diffracted by the interference pattern so that FIG. 11 can be compare with FIG. 10. As already explained in the recording method, the recorded interference pattern is formed by the interference between the recording beam 41 at S+45 degrees with the reference beam 42 at P−45 degrees. If the reproduction reference beam 42 at P−45 degrees is incident on the recording medium 20, the reference beam 42 is diffracted by the interference pattern, and returned to the objective 55 side. A diffracted light 43 passed through the objective 55 and then the gyrator 54 is passed through the gyrator 54 in a direction opposite to the direction in which the reference beam 42 is incident on the gyrator 54. Therefore, the plane of polarization of the diffracted light 43 is rotated by +45 degrees. As a result, the diffracted light 43 is transformed to a P-polarized light (at P−45+45 degrees), is passed straight through the PBS 53, and reaches a reproduction optical system (not shown).

A part of the light which is not diffracted by the interference pattern is progressed straight and passed through a right side of the objective 55. Since the part of light is passed through the right side of the objective 55 from below, it is transformed to an S-polarized light (at P−45−45 degrees). Therefore, the light cannot be passed straight through the PBS 53 but is bent toward the SLM 52 by 90 degrees. As a result, the part of the light is not returned to the reproduction optical system and does not act as a noise source.

Further, a part of the incident light at P−45 degrees is diffracted by an interference pattern (not shown) stretched on a left side of the recording layer 15 before the light reaches the reflecting layer 12, so that the part of the incident light contributes to a signal. Namely, both the diffracted light formed by diffracting the reference beam 42 reflected by the reflecting layer 12 and the diffracted light formed by diffracting the reference beam 42 which is not reflected by the reflecting layer 12 contribute to forming a reproduced light. A quality of the reproduced light is improved, accordingly. In the reproduction reference beam 42, a behavior of the light incident on the right side of the PBS 53 is similar to the reproduction reference beam 42 incident as the polarized light at P−45 degrees on the medium 20 except for incidence on the medium 20 as the polarized light at P+45 degrees.

Figure 12:
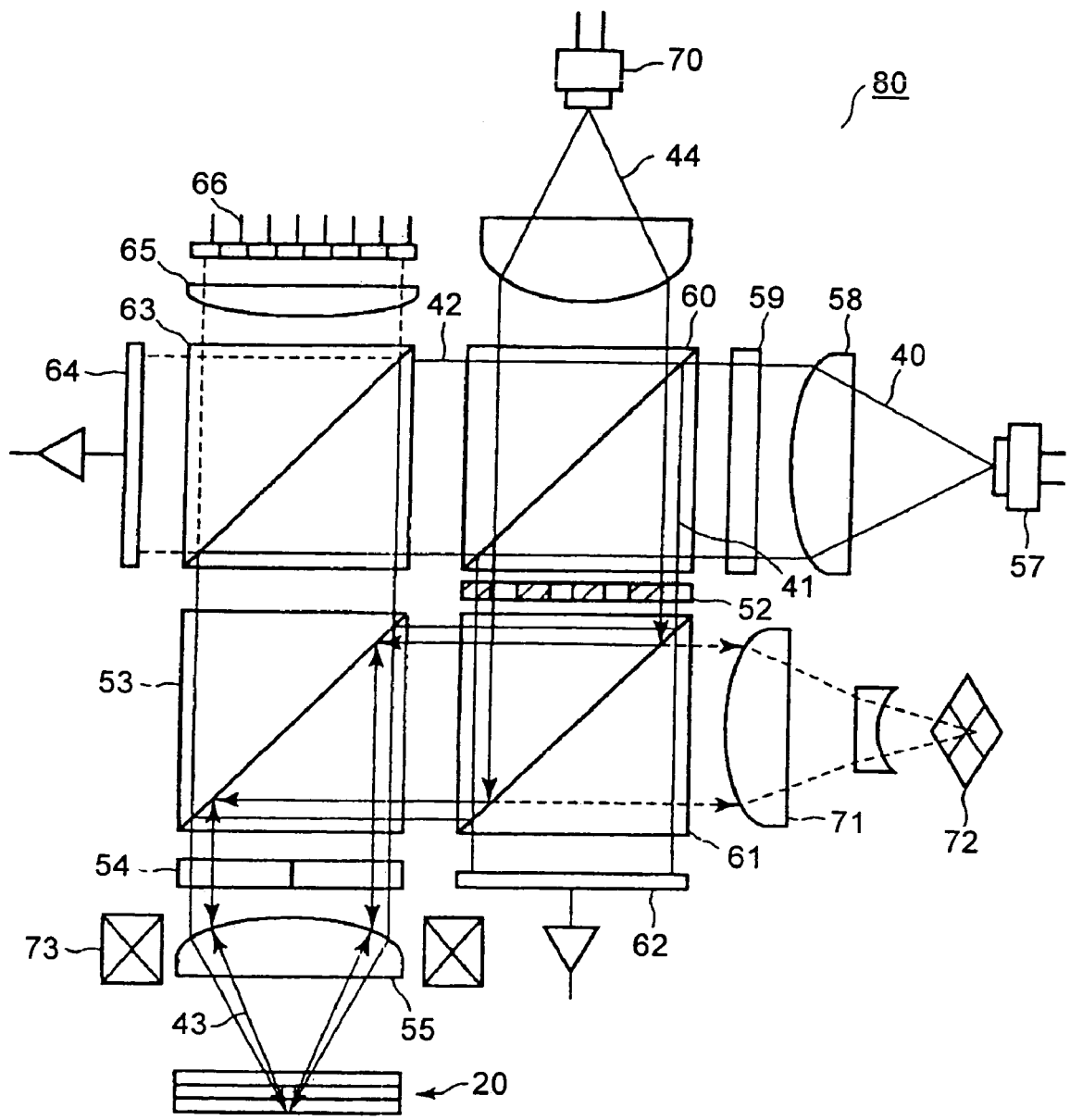
FIG. 12 is a schematic diagram of one example of a recording and reproduction apparatus capable of carrying out the recording method according to FIG. 10, and the reproduction method according to FIG. 11.

FIG. 12 is a schematic diagram of one example of a recording and reproduction apparatus capable of carrying out the recording method according to FIG. 10 and the reproduction method according to FIG. 11.

A recording and reproduction apparatus 80 shown in FIG. 12 includes, for example, a laser light source which outputs a light 40 having a long coherence length suited for holographic recording as a recording and reproduction light source 57. At present, a most ordinary light source for the holographic recording is a solid laser which emits a laser light at a wavelength of 532 nanometers. Alternatively, one of a $Kr^+$ gas laser, a semiconductor laser including an external resonator (a wavelength of a laser light emitted by which laser can be freely selected from a blue wavelength to a near-infrared wavelength, typically 405, 650, or 780 nanometers), and a semiconductor laser (LD) having a long coherence length even if the LD does not include an external resonator, e.g., a distributed feedback (DFB) laser, a distributed Bragg reflector (DBR) laser, or a vertical cavity surface emitting laser (VCSEL) can be used as the laser light source. Depending on a type of the laser light source used as the light source 57, a beam formation prism or the like may be provided between the light source 57 and a lens 58.

The light 40 emitted from the light source 57 is transformed to a parallel light by the lens 58, and transmitted by a half wave plate 59. An intensity ratio of the recording beam 41 to the reference beam 42 can be adjusted by rotating the half wave plate 59. Preferably, the S-polarized recording beam 41 and the P-polarized reference beam 42 incident on the recording medium 20 are made equal during recording. After the light 40 is passed through the half wave plate 59, the light 40 is incident on a PSB 60 and divided into the S-polarized recording beam 41 and the P-polarized reference beam 42.

The recording beam 42 is then transmitted by a shutter 51 (not shown in FIG. 12) and an SLM 52, and incident on a half mirror (HM) 61. A PBS or a total reflection mirror may be used in place of the HM 61. From viewpoints of an improvement in a utilization efficiency of the recording beam 41, the PBS or the total reflection mirror capable of reflecting the S-polarized light substantially entirely is preferably used. From other viewpoints, however, the HM 61 instead of the PBS or the total reflection mirror is preferably used for the following reason. If the HM 61 is used, a part of the recording beam 41 is made incident on a photodetector (PD) 62 that detects an information light intensity and the intensity of the recording beam 41 can be detected. The recording beam 41, an optical path of which is bent by 90 degrees by HM 61, is incident on the PBS 53, in which the optical path of the recording beam 41 is bent again by 90 degrees, and incident on the recording medium 20.

The P-polarized reference beam 42 is passed straight through the PBS 60. A part of the P-polarized reference beam 42 is bent by 90 degrees toward the recording medium 20 by an HM 63, whereas the other part of the P-polarized reference beam 42 is incident on a reference beam PD 64 and used for detection of the intensity of the reference beam 42. An orientation of the half wave plate 59 can be controlled so as to make the intensity of the recording beam 41 and that of the reference beam 42 incident on the medium 20 equal to each other if the recording beam PD 62 and this reference beam PD 64 can detect the intensity of the recording beam 41 and that of the reference beam 42, respectively.

The reference beam 42 bent by the HM 63 toward the medium 20 is passed through the PBS 53 and incident on the medium 20. Following this, recording and reproduction are performed according to the methods explained with reference to FIGS. 10 and 11.

The reproduction system will be supplementally explained. As already explained with reference to FIG. 11, the diffracted light 43 contributing to reproduction is returned to the P-polarized light and passed straight through the PBS 53. A part of the diffracted light 43 is passed straight through the HM 63, and converged on a charge-coupled device (CCD) detector 66 by an imaging lens 65. The CCD detector 66 converts a light intensity distribution corresponding to an interference pattern formed in the recording layer 16 into an electric signal, whereby information is reproduced. Further, the other part of the diffracted light 43 passed straight through the PBS is reflected toward the light source 57 by the HM 63. If a monitor is provided on a front end or a back end of the light source 57, the diffracted light 43 reflected by the HM 63 can be detected by the monitor. By driving the light source 57 by high frequency superposition, the stability of the light 40 emitted from the light source 57 can be improved.

A servo optical system will next be explained.

As shown in FIG. 12, in the recording and reproduction apparatus 80, it is normal to provide a servo light source 70 and the recording and reproduction light source 57 independently, and make wavelengths different from each other. Normally, the wavelength of the light source 70 is set longer than that of the light source 57. For example, if the wavelength of the light source 57 is 405 nanometers, the wavelength of the light source 70 is set at 532, 650, or 780 nanometers. If the wavelength of the light source 57 is 532 nanometers, the wavelength of the light source 70 is set at 650 or 780 nanometers.

If the wavelength of a servo light 44 differs from that of the recorded or reproduced light 40, then the servo light 44 reaches the reflecting layer 12 in the medium 20 via the PBS 60, the HM 61, and the PBS 53 in this order, depending on a design of the PBS 60 or the like. Servo information is recorded as, for example, pits between the interface (servo surface) between the transparent layer 14 and the reflecting layer 12. The servo light 44 reflected by the reflecting layer 12, therefore, carries the servo information.

The servo light 44 reflected by the reflecting layer 12 is passed through a lens 71, arranged if it is necessary to do so, and detected by a quad-split PD 72 for focusing and tracking. The detected servo light 44 is converted into an electric signal, and input to a controller (not shown). Based on an output signal from this controller, an operation of a voice coil motor (VCM) 73 is controlled to move the objective 55 to an appropriate position. In this way, focusing, tracking, and addressing controls are carried out. Alternatively, the servo light 44 reflected by the servo surface may be divided by arranging a plurality of HM's, and the focusing, tracking, and addressing controls may be independently executed using divided servo lights 44, respectively. The configuration of a servo light detection system can be basically made equal to that of a light detection system used in a digital versatile disk (DVD) drive or a compact disk (CD) drive.

If the focusing, tracking, and addressing controls are carried out, the holographic recording medium 20 is structured, for example, as follows.

If the holographic recording medium 20 is, for example, disk shaped, the servo surface is divided to tracks in a radial direction of the disk and to sectors in a tangential direction. The sector is composed by a header part that includes address information, control information, and the like as a pre-pit pattern, and a data part on which user data can be recorded. For example, in the header part, a pit sequence corresponding to the tracking information and a pit pattern corresponding to the address information are sequentially provided to be distanced from each other along with the shifting direction to the head of the medium 20. Further, in the data part, the surface (servo surface) of the transparent layer 14 on which the reflecting layer 12 is formed is provided with no pits and formed as a mirror-finished surface. Namely, if this structure is adopted, tracking is carried out by sample servo.

If irregularities such as tracking guide grooves are formed in the data part, the recording beam and the reflection light are dispersed by the irregularities, thereby disadvantageously making it difficult to record and reproduce a desired interference pattern. With the structure adopted for the medium 20 explained above, by contrast, this disadvantage does not occur since the data part has the mirror-finished surface. It is noted, however, that it is difficult to make the sample servo tracking to compatible with the CD or the DVD. Considering the low compatibility of the sample servo tracking therewith, it is advantageous to adopt others structures for the holographic recording medium 20.

The holographic recording medium 20 has been explained so far, while considering the holographic recording based on the reflection polarized collinear holography. If the reflecting layer 12 is removed from the recording medium 20, transmission holographic recording can be also performed.

Information is recorded on the holographic recording medium according to the embodiments of the present invention by the holographic recording method. In the holographic recording, information is added to one of two lights to make the one light serve as the recording beam, and interference patterns generated by the interference between the recording beam and the other light (reference beam) are recorded. Due to this, an optical path difference between the two lights occurs. If a light having a short coherence length, the interference patterns are not generated. Therefore, it is preferable to use a laser having a longer coherence length than the optical path difference.

The present invention will be explained in detail with reference to examples and comparative examples shown below.

FIRST EXAMPLE

An instance in which the recording layer consists of the photorefractive polymer will be explained.

Each component having the following formulation is dissolved in toluene to prepare a toluene solution for making a recording layer.

| | |
|---|---|
| Charge generating material: | 0.2 wt % |
| Diethyl-1,2-methano(60)-flarene-61,61-dicarboxylate | |
| Charge transporting material: | 30.0 wt % |
| N,N'-Diphenyl-N,N'-(2-naphthyl)-(1,1'-phenyl)-4,4''-diamine | |
| Trapping material: | 10.0 wt % |
| N,N'-Diphenyl-N,N'-(2-naphthyl)-(p-terphenyl)-4,4''-diamine | |
| Non-linear optical material: | 40.0 wt % |
| [[4-(Dimethylamino)phenyl]methylene]-2-methyl-4-nitrobenzeneamine | |
| Polymethyl methacrylate | 19.8 wt % |

Using the toluene solution, the holographic recording medium shown in FIG. 4 is manufactured.

Two polymethyl methacrylate films each having a thickness of 300 micrometers are prepared first, and stretched and oriented at a glass transition temperature or higher. The two films are laminated so as to differ in stretching direction by 90 degrees, and a good solvent is sprayed and bonded to the laminated films, thereby forming the transparent layer 14. This transparent layer 14 is used as a transparent substrate.

A cylindrical master is stamped on one of the transparent layer 14, thereby forming pre-grooves. Ag and $SiO_2$ are deposited by sputtering, thereby forming the reflecting layer 12 and the passivation layer 11. $CaF_2$ is deposited by a thickness of 100 nanometers by sputtering on the other surface of the transparent layer 14, thereby forming the intermediate layer 19.

A toluene solution for manufacturing a recording medium is cast on the intermediate layer 19, thereby forming the organic recording layer 15 having a thickness of 200 micrometers. Since $CaF_2$ is insoluble in toluene, the interface between the organic recording layer 15 and the intermediate layer 19 can be made very flat with irregularities of 100 nanometers or less. A sheet on which all of these layers are laminated is cut into a disk, thereby providing a holographic recording medium.

The holographic recording medium thus obtained is evaluated using the recording and reproduction apparatus 80 shown in FIG. 12.

As shown in FIG. 10, a pickup converges and irradiates the recording beam 41 and the reference beam 42. In this example, a lens having an effective aperture ratio of 0.5 is employed, and the laser at a wavelength of 532 nanometers and a power of 20 milliwatts is employed as the light source. By introducing the PBS 53 and the gyrator 54, the recording beam 41 incident on the recording layer 15 interferes with the reference beam 42 passed through the recording layer 15 and reflected by the reflecting layer 12. At the same time, the reference beam 42 incident on the recording layer 15 interferes with the recording beam 41 passed through the recording layer 15 and reflected by the reflecting layer 12.

If a laser beam is converged, a diameter of the beam on the incident surface of the organic recording layer 15 is 1200 micrometers and a diameter of the beam on the substrate-side organic recording layer 15 is 900 micrometers. After different pieces of information are recorded by shift multiplexing while shifting the beam by 5 micrometers each, the power of the laser is reduced to a one-hundred and recorded information is reproduced.

As a result, the recorded information can be reproduced with an accuracy as high as a read after write (RAW) bit error rate of $10^{-5}$ or less.

FIRST COMPARATIVE EXAMPLE

In a first comparative example, a recording medium is manufactured by the same method as that used in the first example except that a polycarbonate film is used as the transparent substrate.

The recording medium obtained is evaluated by the same recording and reproduction apparatus as that used in the first example. Although the incident light is returned, the RAW bit error rate is $10^{-2}$ or more and a good result cannot be, therefore, obtained.

SECOND EXAMPLE

In a second example, a holographic recording medium is manufactured by the same method as that used in the first example except that a similar transparent layer is further laminated on the organic recording layer.

The recording medium obtained is evaluated by the same recording and reproduction apparatus as that used in the first example. The RAW bit error rate is not lowered.

SECOND COMPARATIVE EXAMPLE

In a second comparative example, a holographic recording medium is manufactured by the same method as that used the first comparative example except that a similar polycarbonate film is further arranged on the recording layer.

The recording medium obtained is evaluated by the same recording and reproduction apparatus as that used in the preceding examples. No reproduced light is observed.

THIRD EXAMPLE

In a third example, a recording layer is formed using the photopolymer.

Each component having the following formulation is blended to prepare a photopolymer material for making a recording layer.

| | |
|---|---|
| Matrix material: Di(urethane-acrylate) oligomer | 63.83 wt % |
| Monomer: Isobornyl acrylate | 25.0 wt % |
| Vinyl-1-naphthoate | 10.0 wt % |
| Photoinitiator: CG-784 | 1.0 wt % |
| Decoloring agent: tert-Butyl-hydroxy peroxide | 0.17 wt % |

Using the photopolymer material obtained, a holographic recording medium in this example is manufactured. The recording medium manufactured herein is the same as that shown in FIG. 6 except that an intermediate layer is formed between the transparent layer 24 and the recording layer 15.

The photopolymer material is put between Teflon films and partially cured. Thereafter, the Teflon films are peeled off, thereby forming a photopolymer film. The photopolymer film has a refractive index of 1.62 relative to a light at 532 nanometers. This film is formed to be rolled.

As the material of the transparent layer, PMMA and OVDF are used. The PMMA and OVDF are mixed together at a weight ratio of 80:20, and a resultant mixture is formed into a disk, thereby forming a transparent disk. This transparent disk is used as the transparent substrate.

Pre-grooves are formed on one surface of the transparent disk, and a reflecting layer is also provided on the one surface thereof. $MgF_2$ is deposited on the other surface of the transparent disk by a thickness of 0.2 micrometer by sputtering, thereby forming the intermediate layer.

The photopolymer film formed in advance is cut into a disk. Using a hot melt adhesive, the disk-like photopolymer film is bonded onto the intermediate layer. The adhesive is applied on both the photopolymer film and the intermediate layer each by about 1 micrometer by spray coating. The photopolymer film and the intermediate layer are press-fitted against each other while irradiating an infrared (IR), whereby the photopolymer film and the intermediate layer can be closely attached to each other.

The holographic recording medium in this embodiment is thereby completed.

The holographic recording medium thus obtained is evaluated using the same recording and reproduction apparatus as that used in the first example. In this example, however, the power of the laser is changed to 50 milliwatts.

If a laser beam is converged, a diameter of the beam on the incident surface of the organic recording layer 15 is 1200 micrometers and a diameter of the beam on the substrate-side organic recording layer 15 is 900 micrometers. After different pieces of information are recorded by shift multiplexing while shifting the beam by 3 micrometers each, the power of the laser is reduced to one-hundredth and recorded information is reproduced.

As a result, the recorded information can be reproduced with an accuracy as high as the RAW bit error rate of $10^{-5}$ or less.

THIRD COMPARATIVE EXAMPLE

In a third comparative example, a recording medium is manufactured by the same method as that used in the third example except that a polycarbonate film is used as the transparent substrate.

The recording medium obtained is evaluated by the same recording and reproduction apparatus as that used in the third example. The RAW bit error rate is as low as about $10^{-2}$, and reproduction efficiency is thus quite deteriorated.

FOURTH EXAMPLE

In a fourth example, a holographic recording medium is manufactured by the same method as that used in the third example except that a similar transparent layer is further laminated on the recording layer.

The recording medium obtained is evaluated by the same recording and reproduction apparatus as that used in the third example. The RAW bit error rate is not lowered.

FOURTH COMPARATIVE EXAMPLE

In a fourth comparative example, a holographic recording medium is manufactured by the same method as that used in the third comparative example except that a similar polycarbonate film is further arranged on the recording layer.

The recording medium obtained is evaluated by the same recording and reproduction apparatus as that used in the preceding examples. No reproduced light is observed.

FIFTH EXAMPLE

Two polymethyl methacrylate films each having a thickness of 300 micrometers are prepared, and stretched and oriented at the glass transition temperature or higher. The two films are laminated so as to differ in stretching direction by 90 degrees, and a good solvent is sprayed and bonded to the laminated films, thereby forming a transparent layer. This transparent layer is used as the transparent substrate.

A photopolymer film equal in composition to that in the third example is formed on the transparent layer to be rolled.

As the material of the transparent layer, PMMA doped with a birefringent inorganic needle-like crystal in a nano-size is used. By orienting the polymer, particles are also oriented, thereby canceling and eliminating the birefringence of the polymer. The crystal used herein is a strontium carbonate crystal having a negative birefringence, which is synthesized by a carbon dioxide gas compounding method. To maintain transparency of the polymer, fine particles of a particle diameter of 100 to 200 nanometers and an aspect ratio of two to three are used. The material is molded into a disk, thereby forming a transparent disk. This disk is used as the transparent substrate.

Pre-grooves are formed on one surface of the transparent disk, and a reflecting layer is further provided on the one surface. $MgF_2$ is deposited on the other surface of the transparent disk by a thickness of 0.2 micrometer by sputtering, thereby forming an intermediate layer.

The photopolymer film with the transparent substrate manufactured in advance is bonded onto the intermediate layer using a hot melt adhesive. The adhesive is applied on both the photopolymer film and the intermediate layer each by about 1 micrometer by spray coating. The photopolymer film and the intermediate layer are press-fitted against each other while irradiating an IR, whereby the photopolymer film and the intermediate layer can be closely attached to each other. Thus, the photopolymer is bonded to the transparent disk. After bonding, the sheet protruding from the disk is cut, thereby providing a recording medium.

The use of the oriented transparent substrate on the light incidence-side of the recording layer, and the use of the injection-molded substrate on the reflecting surface side thereof are appropriate for the recording medium. This is because the injection-molded substrate has a sufficient mechanical strength, and the oriented transparent substrate can relax a stress applied to the recording layer.

The holographic recording medium in this embodiment is thus completed.

The holographic recording medium thus obtained is evaluated by the same recording and reproduction apparatus as that used in the third example.

If a laser beam is converged, a diameter of the beam on the incident surface of the organic recording layer 15 is 1200 micrometers and a diameter of the beam on the substrate-side organic recording layer 15 is 900 micrometers. After different pieces of information are recorded by shift multi-plexing while shifting the beam by 3 micrometers each, the power of the laser is reduced to a one-hundred and recorded information is reproduced.

As a result, the recorded information can be reproduced with an accuracy as high as a RAW bit error rate of $10^{-5}$ or less.

FIFTH COMPARATIVE EXAMPLE

In a fifth comparative example, a recording medium is manufactured by the same method as that used in the fifth example except that a polycarbonate film is used as the transparent substrate.

The recording medium obtained is evaluated by the same recording and reproduction apparatus as that used in the third example. The RAW bit error rate is as low as about $10^{-1}$, and reproduction efficiency is thus quite deteriorated.

SIXTH EXAMPLE

Two polymethyl methacrylate films each having a thickness of 300 micrometers are prepared, and stretched and oriented at a glass transition temperature or higher. The two films are laminated so as to differ in stretching direction by 90 degrees, and a good solvent is sprayed and bonded to the laminated films, thereby forming a transparent layer. This transparent layer is arranged on a light incidence-side relative to the recording layer.

A photopolymer film equal in composition to that in the third example is formed on the transparent layer to be rolled.

As the material of the transparent layer, PMMA doped with a birefringent inorganic needle-like crystal in a nano-size is used. By orienting the polymer, particles are also oriented, thereby canceling and eliminating the birefringence of the polymer. The crystal used herein is a strontium carbonate crystal having a negative birefringence, which is synthesized by a carbon dioxide gas compounding method. To maintain transparency of the polymer, fine particles of a particle diameter of 100 to 200 nanometers and an aspect ratio of two to three are used. The material is injection-molded into a disk, thereby forming a transparent disk. This disk is used as the transparent substrate.

Pre-grooves are formed on one surface of the transparent disk, and a reflecting layer is further provided on the one surface. $MgF_2$ is deposited on the other surface of the transparent disk by a thickness of 0.2 micrometer by sputtering, thereby forming an intermediate layer.

The photopolymer film with the transparent substrate manufactured in advance is bonded onto the intermediate layer using a hot melt adhesive. The adhesive is applied on both the photopolymer film and the intermediate layer each by about 1 micrometer by spray coating. The photopolymer film and the intermediate layer are press-fitted against each other while irradiating an IR, whereby the photopolymer film and the intermediate layer can be closely attached to each other. Thus, the photopolymer is bonded to the transparent disk. After bonding, the sheet protruding from the disk is cut, thereby providing a recording medium.

The holographic recording medium in this embodiment is thus completed.

The use of the oriented transparent substrate on the light incidence-side of the recording layer, and the use of the molded substrate on the reflecting surface side thereof are appropriate for the recording medium. This is because the injection-molded substrate has a sufficient mechanical strength, and the oriented transparent substrate can relax a stress applied to the recording layer.

The holographic recording medium thus obtained is evaluated by the same recording and reproduction apparatus as that used in the third example.

If a laser beam is converged, a diameter of the beam on the incident surface of the organic recording layer 15 is 1200 micrometers and a diameter of the beam on the substrate-side organic recording layer 15 is 900 micrometers. After different pieces of information are recorded by shift multi-plexing while shifting the beam by 3 micrometers each, the power of the laser is reduced to a one-hundred and recorded information is reproduced.

As a result, the recorded information can be reproduced with an accuracy as high as a RAW bit error rate of $10^{-5}$ or less.

It should be noted that the present invention is not limited to the embodiments. For example, according to the embodiments, the material obtained by molding a mixture of the materials each having the positive specific birefringence and the materials each having the negative specific birefringence, with at least the positive specific birefringent materials or the negative specific birefringent materials being polymers is used as the material of the transparent substrate. In addition, the layer including a plurality of resin films laminated so that respective pairs of the resin films differ in stretching direction by 90 degrees is used as the transparent layer. Conversely, the layer including a plurality of resin films laminated so that respective pairs of the resin films differ in stretching direction by 90 degrees may be used as the transparent substrate. In addition, the material obtained by molding a mixture containing the materials each having the positive specific birefringence and the materials each having the negative specific birefringence, with at least the positive specific birefringent materials or the negative specific birefringent materials being polymers may be used as the material of the transparent layer.

According to the embodiments, the step of cutting the reflecting layer and the holographic recording layer besides the transparent sheet after forming the reflecting layer and the holographic recording layer on the transparent sheet, is explained as the step of cutting the transparent sheet including a plurality of resin films laminated so that respective pairs of resin films differ in stretching direction by 90 degrees, into a disk. However, the present invention is not limited to the embodiments. It is also possible to adopt (i) a step of cutting the transparent sheet and the reflecting layer into a disk, and forming the holographic recording layer on the transparent sheet cut into the disk, after forming the reflecting layer and the holographic recording layer on the transparent sheet, (ii) a step of cutting the transparent sheet and the holographic recording layer into a disk, and forming the reflecting layer on the transparent sheet cut into the disk, after forming the holographic recording layer on the transparent sheet, or (iii) a step of forming the reflecting layer and the holographic recording layer on the transparent sheet cut into a disk after the transparent sheet is cut into the disk.

Furthermore, the step of forming the tracking grooves on one surface of the transparent sheet may be executed either before or after the step of cutting the transparent sheet into the disk. The transparent sheet can be cut into a shape (e.g., a square, rectangle, or ellipse) other than a disk at the step of cutting.

As explained so far in detail, the present invention provides the holographic recording medium which is mounted in the holographic recording apparatus, and which enables recording at the high SN ratio without changing the polarization of the recording beam and the reference beam, and the manufacturing method for the holographic recording medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A holographic recording medium comprising:
    a first transparent layer including a servo surface and a light incidence surface facing each other;
    a reflecting layer located on a servo surface-side of the first transparent layer; and
    a holographic recording layer located on a light incidence-side of the first transparent layer, wherein
    the first transparent layer includes a mixture of a first material having a positive birefringence and a second material having a negative birefringence, at least one of the first material and the second material being a polymer.

2. The holographic recording medium according to claim 1, further comprising a second transparent layer located on a light incidence-side of the holographic recording layer, wherein
    the second transparent layer includes a third material having a positive birefringence and a fourth material having a negative birefringence, at least one of the third material and the fourth material being the polymer.

3. The holographic recording medium according to claim 2, further comprising an intermediate layer located between the holographic recording layer and the second transparent layer.

4. The holographic recording medium according to claim 1, further comprising a first intermediate layer located between the holographic recording layer and the first transparent layer.

5. The holographic recording medium according to claim 4, further comprising a second transparent layer located on a light incidence-side of the holographic recording layer, wherein
    the second transparent layer includes a third material having a positive birefringence and a fourth material having a negative birefringence, at least one of the third material and the fourth material being the polymer.

6. The holographic recording medium according to claim 5, further comprising a second intermediate layer located between the holographic recording layer and the second transparent layer.

* * * * *